United States Patent [19]

Levinberg et al.

[11] Patent Number: 5,053,782

[45] Date of Patent: Oct. 1, 1991

[54] COMMERCIAL SATELLITE COMMUNICATIONS SYSTEM

[75] Inventors: Amiram Levinberg, Ramat Gan; Uzi Ram, Givat Haelah, both of Israel

[73] Assignee: Gilat Communication Systems Ltd., Tel Aviv, Israel

[21] Appl. No.: 450,248

[22] Filed: Dec. 13, 1989

[51] Int. Cl.$^5$ .................. H04B 7/185; G01S 13/08
[52] U.S. Cl. .................. 342/352; 342/132; 455/12
[58] Field of Search .......... 342/352, 367, 132; 455/12; 375/1

[56] References Cited

U.S. PATENT DOCUMENTS

| | | | |
|---|---|---|---|
| 3,654,395 | 4/1972 | Schmidt | 342/352 |
| 4,280,203 | 7/1981 | Gilmour | 367/103 |
| 4,553,221 | 11/1985 | Hyatt | 364/514 |
| 4,879,713 | 11/1989 | Ichiyoshi | 342/357 |
| 4,943,974 | 7/1990 | Motamedi | 375/1 |

Primary Examiner—Gregory C. Issing
Attorney, Agent, or Firm—Marshall, O'Toole, Gerstein, Murray & Bicknell

[57] ABSTRACT

A satellite communication system including a central satellite communication terminal and a multiplicity of remote satellite communication terminals which communicate via a satellite, apparatus associated with each of the multiplicity of remote satellite communication terminals for transmitting a burst of information within a time slot and having a characteristic which is independent of the time slot and receiving apparatus associated with the central satellite communication terminal for acquiring the characteristic during each time slot and receiving the burst according to the time slot and according to the characteristic, whereby multiple transmissions may occur concurrently within a given frequency bandwidth.

17 Claims, 23 Drawing Sheets

COMMERCIAL SATELLITE COMMUNICATIONS SYSTEM

FIELD OF THE INVENTION

The present invention relates to civilian satellite communications and more particularly to satellite communications systems and techniques useful in financial transactions.

BACKGROUND OF THE INVENTION

With the significant increase in the use of consumer credit and other financial facilities, the need for quick, reliable and low-cost verification of creditworthiness has gained in importance. Currently credit verification facilities are based on land-based telephone lines and involve a cost of approximately ten cents per transaction.

SUMMARY OF THE INVENTION

The present invention seeks to provide a low cost, quick, reliable two-way point to multipoint satellite communications system which is particularly suitable for handling intermittent high density bursts of communications.

There is thus provided in accordance with a preferred embodiment of the present invention a satellite communication system comprising a central satellite communication terminal and a multiplicity of remote satellite communication terminals which communicate via a satellite, apparatus associated with each of the multiplicity of remote satellite communication terminals for transmitting a burst of information within a time slot and having a characteristic which is independent of the time slot and receiving apparatus associated with the central satellite communication terminal for acquiring the characteristic during each time slot and receiving the burst according to the time slot and according to the characteristic, whereby multiple transmissions may occur concurrently within a given frequency bandwidth.

According to a preferred embodiment of the present invention, the characteristic is also independent of time synchronization with the central satellite communication terminal.

Additionally in accordance with a preferred embodiment of the invention, the characteristic is a frequency characteristic.

Alternatively according to another preferred embodiment of the invention, the characteristic is a phase characteristic indicating the position of transmission windows within a given time slot. In this embodiment, matched Chirp filters may be advantageously employed in both the central and remote satellite communications terminals to enable transmission to be effected within a generally constant amplitude envelope, which is particularly suitable for satellite transmissions.

In accordance with the present invention the remote satellite communications terminals may employ relatively frequency unstable oscillators, significantly lowering the cost thereof without degradation of performance.

There is also provided in accordance with a preferred embodiment of the present invention a satellite communication system comprising a central satellite communication terminal and a multiplicity of remote satellite communication terminals which communicate via a satellite, apparatus associated with the central satellite communication terminal for transmitting information having a wide band modulation characteristic and apparatus associated with the remote satellite communications terminals for receiving the information according to the wide band modulation characteristic, the apparatus for transmitting and the apparatus for receiving employing matched Chirp filters to enable transmission to be effected within a generally constant amplitude envelope, which is particularly suitable for satellite transmissions.

Additionally in accordance with a preferred embodiment of the invention each of the multiplicity of remote satellite communication terminals which is operative for receiving includes an antenna whose size is sufficiently small that in the absence of the use of linear FM Chirp waveforms or spread spectrum processing in transmission, the satellite power spectral density would exceed 6 dbW/4 Khz in the Ku band.

There is thus provided in accordance with an embodiment of the present invention a satellite communication system including a plurality of remote satellite communication terminals which communicate via a satellite and apparatus associated with each of the plurality of remote satellite communication terminals for transmitting and receiving information and including apparatus for transmitting and receiving linear FM Chirp waveforms carrying the information.

Preferably each of the plurality of remote satellite communication terminals which is operative for transmission includes an antenna whose size is sufficiently small that in the absence of the use of linear FM Chirp waveforms or spread spectrum processing in transmission, the off-beam power spectral density emitted from the transmitting antenna would exceed 15–25l og(theta) dbW/4 Khz for theta between 1 and 7 degrees for the Ku band.

For the purposes of the present application, spread spectrum processing is defined to mean a process wherein a modulated communication signal is multiplied by a relatively high rate periodic digital sequence of phases, thereby causing rapid phase shifts of the original signal, and providing a widened frequency bandwidth and a consequently lowered power spectral density.

Additionally in accordance with a preferred embodiment of the present invention, each of the plurality of remote satellite communication terminals which is operative for receiving includes an antenna whose size is sufficiently small that in the absence of the use of linear FM Chirp waveforms or spread spectrum processing in transmission, the satellite power spectral density would exceed 6 dbW/4 Khz in the Ku band.

BRIEF DESCRIPTION OF THE DRAWINGS

The present invention will be understood more fully from the following detailed description, taken in conjunction with the drawings in which.

DETAILED DESCRIPTION OF PREFERRED EMBODIMENTS

Figure 1:
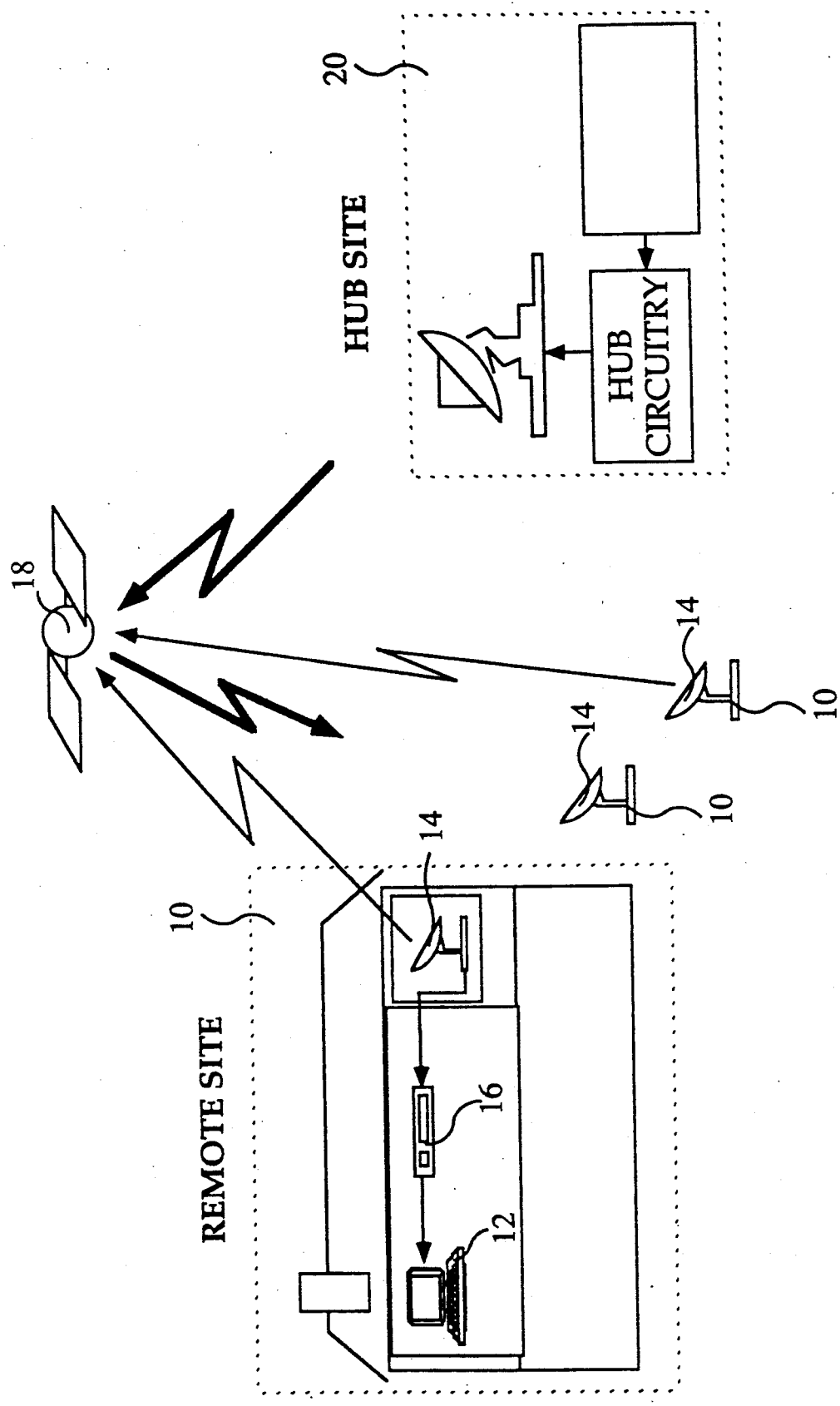
FIG. 1 is a generalized block diagram illustration of a satellite communications system constructed and operative in accordance with a preferred embodiment of the present invention.

Reference is now made to FIG. 1, which illustrates a satellite communications system constructed and operative in accordance with a preferred embodiment of the present invention and which is particularly suitable for transmission of bursts of information containing data concerning individual financial transactions.

In accordance with a preferred embodiment of the invention, there are provided a multiplicity of remote satellite communications stations 10, each of which may be coupled to a corresponding user interface 12, such as a credit verification unit of the type commercially used in retail outlets, or alternatively, an IBM PC computer, which may be located at a retail outlet, for example. Each of the remote satellite communications stations 10 typically comprises a very small aperture antenna 14, typically of diameter of less than about four feet and a communications terminal 16.

According to a preferred embodiment of the invention, the communications terminal 16 comprises apparatus for transmitting a burst of information within a time slot and having a characteristic which is independent of the time slot and which does not require pre-synchronization with a receiving terminal.

The multiplicity of remote stations 10 communicates via a satellite 18 with a central communication station 20 (Hub Site), which may, for example, be coupled to a bank's or credit card company's central credit verification computer via a conventional interface (not shown).

Preferably the mode of communication from the remote stations 10 to the central communication station 20 is full duplex wherein bursts of information are sent by the remote stations 10 on a random access basis, such as slotted Aloha, to the central communication station 20. It is a particular feature of the present invention that a very large number of remote stations 10 can communicate with the central communication station 20 on a random access basis without unacceptable interference. Such interference would normally arise due to the fact that a plurality of remote stations 10 may transmit within the same time slot over the same frequency band.

According to the present invention, such interference is greatly reduced by allowing each remote station to select an additional recognizable transmission characteristic, such as the center frequency of the carrier, or alternatively the phase of the transmission windows within a time slot. The central station is able to recognize this additional characteristic by simple searching and without requiring synchronization. By recognizing the additional characteristic, the central station effectively distinguishes between multiple transmissions arriving within the same time slot, thus creating additional effective channels for receiving transmissions.

Figure 2:
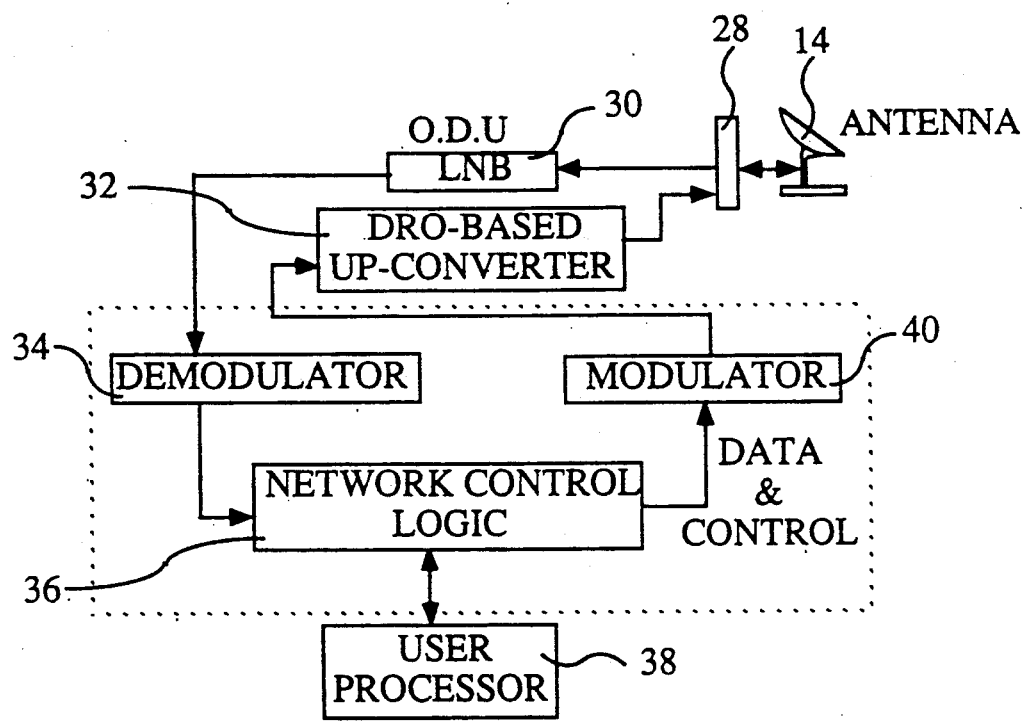
FIG. 2 is a generalized block diagram of a remote satellite communications terminal useful in the system of FIG. 1.

Reference is now made to FIG. 2, which illustrates, in generalized block diagram form, a remote satellite communications terminal useful in the system of FIG. 1. The remote satellite communications terminal is coupled to antenna 14 via an ortho mode polarizer 28, such as model 1810801 manufactured by Antennas For Communications Inc. of Ocala, Fla., U.S.A. and typically includes a low noise block (LNB) converter 30, such as, for example, a Phase Lock Loop Low Noise Block Converter NHZ-170 manufactured by Japan Radio Company of Tokyo, Japan, or alternatively an Ordinary Low Noise Block Converter NOR-6401, commercially available from Norsat of Canada. Converter 30 deals with received signals from the antenna 14.

Signals to be transmitted via the antenna 14 are supplied via polarizer 28 by a DRO-based Up-Converter 32, which will be described hereinbelow in greater detail with reference to FIG. 4.

Received signals from LNB converter 30 are supplied to a demodulator 34, which will be described hereinbelow in greater detail with reference to FIGS. 6A and 6B. The output of demodulator 34 is supplied to network control logic circuitry 36, which is typically based on an Intel SBC 188/56 chip.

The network control logic circuitry interfaces with a User Processor 38, such as an IBM PC computer. Data and control signals to be transmitted are supplied from the network control logic circuitry 36 to a modulator 40, which is described hereinbelow in greater detail with reference to FIGS. 5A and 5B. Modulator 40, in response to the control signals, transmits the data to the converter 32.

Network control logic circuitry 36 performs two principal functions:

Firstly, it initiates transmission of data to the central satellite communication terminal, awaits an acknowledge signal therefrom and in the absence of such an acknowledge signal, retransmits the data in a later time slot. It may pseudorandomly or deterministically select an appropriate later time slot for transmission.

Secondly, it randomly or pseudorandomly selects an additional recognizable transmission characteristic, such as the center frequency of the carrier, or alternatively the phase of the transmission windows within a time slot.

Figure 3:
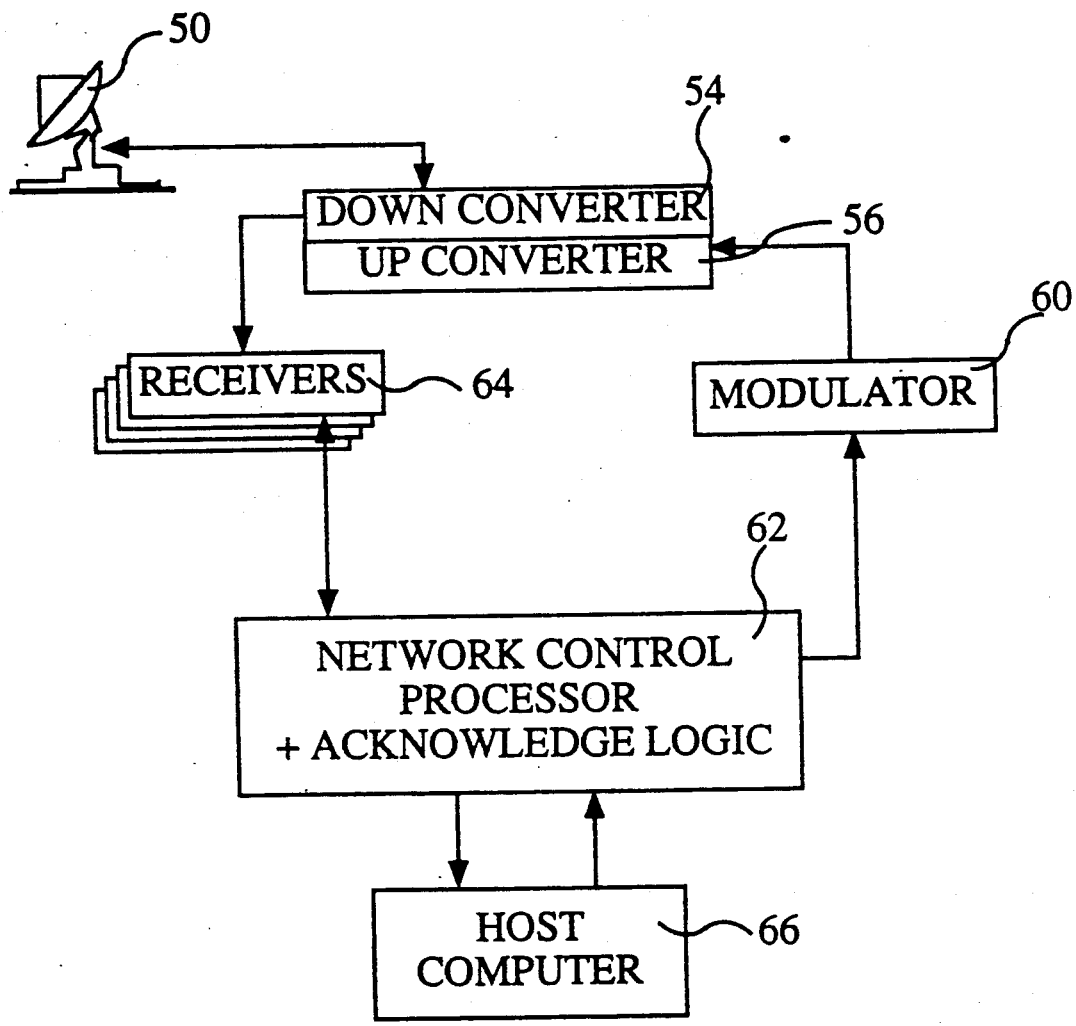
FIG. 3 is a generalized block diagram of a central satellite communications terminal useful in the system of FIG. 1.
Figure 9:
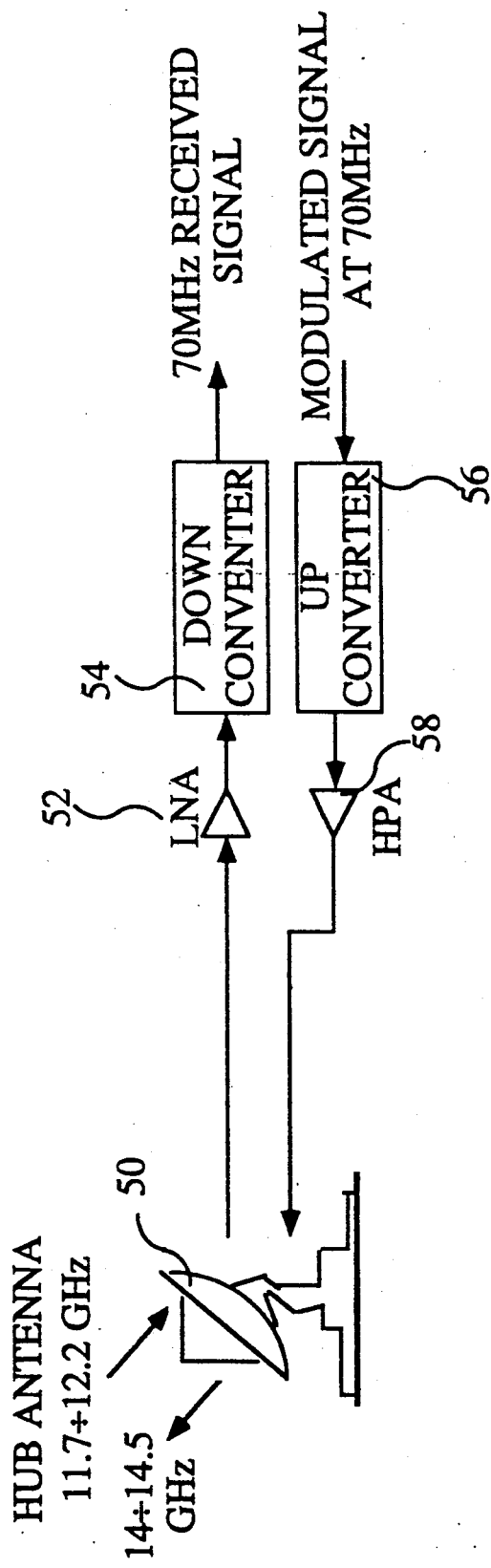
FIG. 9 is a generalized block diagram of yet another part of the circuitry of the terminal of FIG. 3.

Reference is now made to FIGS. 3 and 9, which illustrate, in generalized block diagram form, a central satellite communication terminal 20 useful in the system of FIG. 1. Received signals from an antenna 50, such as a 6.1 KPK manufactured by Vertex of Kilgore, Tex., U.S.A., are supplied via a low noise amplifier 52 (not shown in FIG. 3), such as a NC4 manufactured by LNR Communications, Inc. of Hauppauge, N.Y., U.S.A, to a down converter 54, such as a DC 4020 manufactured by Satellite Transmission Systems, Inc. of Hauppauge, N.Y., U.S.A.

Signals to be transmitted are supplied via an up converter 56, such as a DC 6020 manufactured by Satellite Transmission Systems, Inc., to a high power amplifier (HPA) 58, which is commercially available from Varian of the U.S.A, to antenna 50. The up converter 56 receives an input from a modulator 60 which will be described in greater detail hereinbelow with respect to FIGS. 7A and 7B.

Network Control Processor and Acknowledge Logic circuitry 62 controls operation of the modulator 60 and of a plurality of receivers 64 and receives data from the plurality of receivers 64. Circuitry 62 is responsible for transmission of instructions and data from a host computer 66 to the modulator and from the receivers 64 to the host computer 66. Generally speaking, the function of circuitry 62 is to recognize incoming data bursts received from remote satellite communication terminals 10 (FIG. 1) and to provide acknowledge messages for transmission to the remote terminals 10 in response to the received bursts.

The circuitry 62 and receivers 64 will be described in greater detail hereinbelow with reference to FIG. 8.

Figure 4:
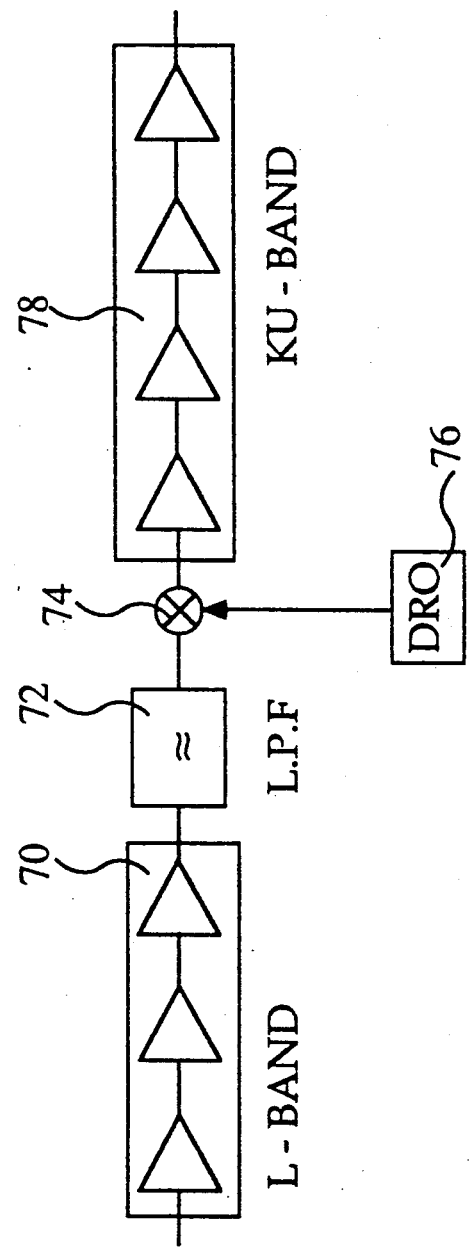
FIG. 4 is a generalized block diagram of part of the circuitry of the terminal of FIG. 2.

Reference is now made to FIG. 4, which illustrates the structure of the DRO-Based Up-Converter circuitry 32 (FIG. 2). An L-Band signal, in the frequency range of about 950–1450 MHz is supplied to a series of L-Band amplifiers 70, such as MAR2 amplifiers, manufactured by Mini Circuits of Brooklyn, N.Y. The output of amplifiers 70 is supplied via a low pass filter 72 of conventional construction to a mixer 74, such as a Ku-Band Mixer, for example, a MC-5807 available from NEC of Japan.

A dielectric resonator oscillator (DRO) 76, such as an MC 5808 available from NEC of Japan, also supplies an input to the mixer 74, producing a Ku-Band output which is supplied via a series of Ku-Band amplifiers 78, typically including MC-5864 and MC-5865 amplifiers available from NEC of Japan. The amplified output of amplifiers 78 is supplied to polarizer 28 (FIG. 1).

Figure 5A:
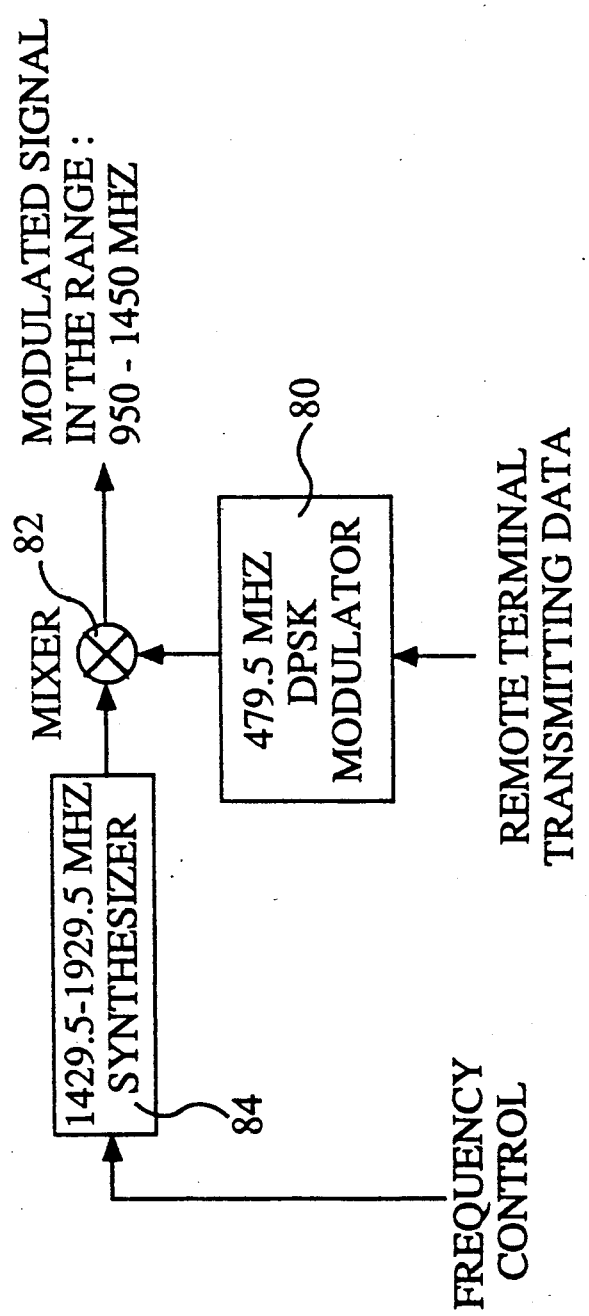
FIG. 5A is a generalized block diagram of another part of the circuitry of the terminal of FIG. 2 constructed and operative in accordance with one embodiment of the invention.

Reference is now made to FIG. 5A, which illustrates one preferred embodiment of modulator 40 (FIG. 2). The modulator of FIG. 5A incorporates a DPSK modulator 80, which will be described hereinbelow in greater detail with reference to FIG. 11. The output of modulator 80 is up converted to L-Band, in the range of about 950–1450 MHz, by a mixer 82, such as a ZFM-2000 available from Mini Circuits and a synthesizer 84, which operates at a selected frequency in the range of about 1429.5–1929.5 MHz in response to frequency control signals received from network logic circuitry 36. Synthesizer 84 will be described in greater detail hereinbelow with reference to FIG. 10.

Figure 5B:
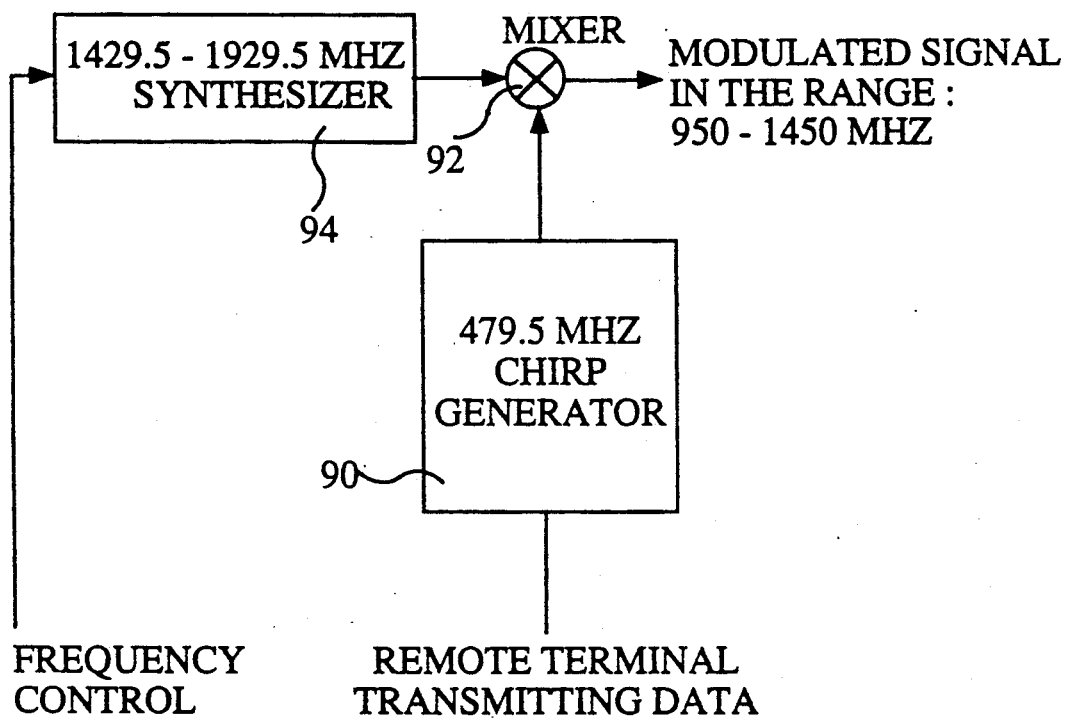
FIG. 5B is a generalized block diagram of another part of the circuitry of the terminal of FIG. 2 constructed and operative in accordance with another embodiment of the invention.

Reference is now made to FIG. 5B, which illustrates another preferred embodiment of modulator 40 (FIG. 2). The modulator of FIG. 5B incorporates a Chirp generator 90, which will be described hereinbelow in greater detail with reference to FIG. 12. The output of generator 90 is up converted to L-Band, in the range of about 950–1450 MHz, by a mixer 92, such as a ZFM-2000 available from Mini Circuits and a synthesizer 94, which operates at a selected frequency in the range of about 1429.5–1929.5 MHz in response to frequency control signals received from network logic circuitry 36. Synthesizer 94 may be identical to synthesizer 84.

Figure 6A:
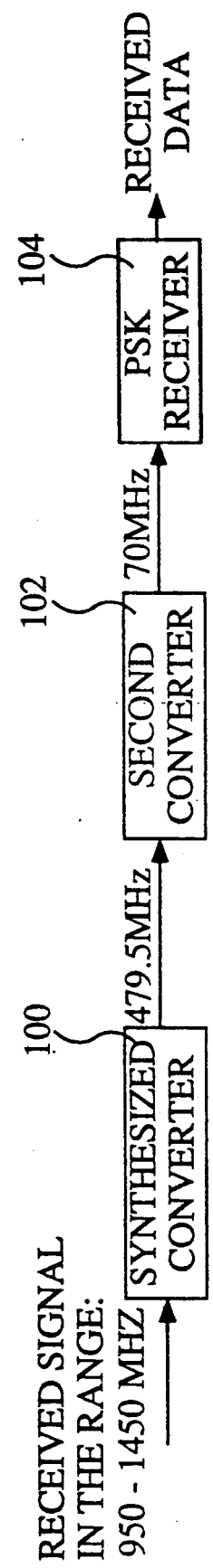
FIG. 6A is a generalized block diagram of yet another part of the circuitry of the terminal of FIG. 2 constructed and operative in accordance with one embodiment of the invention.

Reference is now made to FIG. 6A, which illustrates one embodiment of a demodulator 34 (FIG. 2). The demodulator illustrated in FIG. 6A comprises a synthesized converter 100, such as a TIF-9 available from Mitsumi of Japan, which receives an L-Band signal and converts it to a signal having typical center frequency of 479.5 MHz. A second converter 102, such as a SID-9 from Mitsumi converts the 479.5 MHz signal to a 70 MHz signal and supplies it to a PSK receiver 104, such as an LM 46 available from M/A-Com/Linkabit of the U.S.A. The received data output from PSK receiver 104 is supplied to network control logic 36.

Figure 6B:
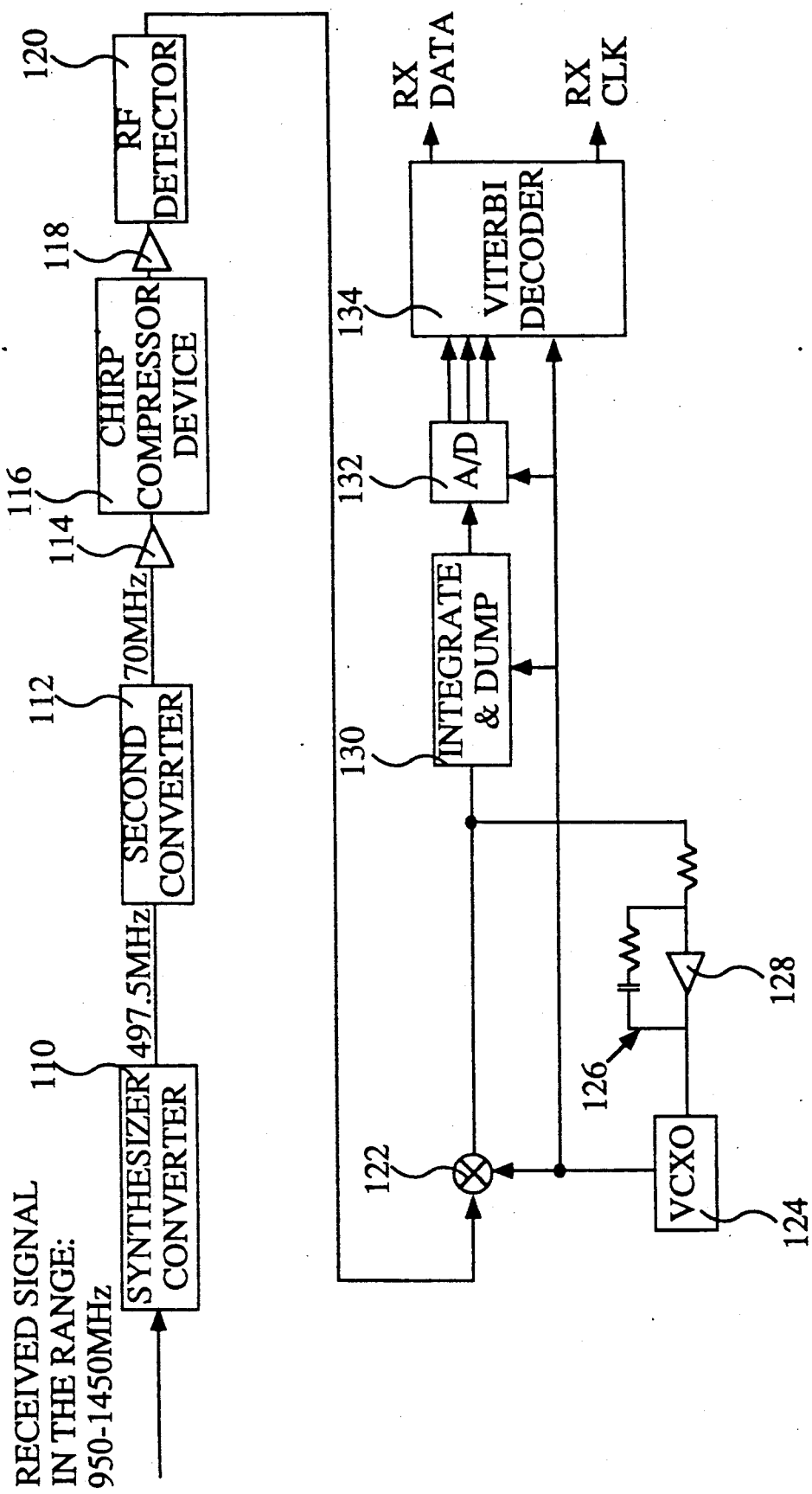
FIG. 6B is a generalized block diagram of yet another part of the circuitry of the terminal of FIG. 2 constructed and operative in accordance with another embodiment of the invention.

Reference is now made to FIG. 6B, which illustrates another embodiment of a demodulator 34 (FIG. 2). The demodulator illustrated in FIG. 6B comprises a synthesized converter 110, such as a TIF-9 available from Mitsumi of Japan, which receives an L-Band signal and converts it to a signal having a typical center frequency of 479.5 MHz. A second converter 112, such as a SID-9 from Mitsumi, converts the 479.5 MHz signal to a 70 MHz signal and supplies it via an amplifier 114, such as a MAR-1 available from Mini Circuits, to a Chirp compressor 116 preferably of a linear FM type, commercially available from Sawtek Inc. of the U.S.A.

The output of the Chirp compressor 116 is supplied via an amplifier 118, such as an MAR-1 available from Mini Circuits, to an RF detector 120, such as a UTD-1000 available from Avantek of the U.S.A. The output of RF detector 120 is supplied to a mixer 122, such as a SBL-1 from Mini Circuits, which also receives an input from a voltage controlled oscillator 124, such as a M 83 of K & L Oscillator of the U.S.A. Oscillator 124 receives a frequency control input from via a loop filter 126, typically implemented as shown based on a 4741 operational amplifier 128, available from Harris of the U.S.A. Circuitry 122, 124, 126 and 128 implements synchronization of a plurality of data transmission windows.

Loop filter 126 receives an input from the output of mixer 122, which is also supplied to integrate and dump circuitry 130, which is also based on a Harris 4741 operational amplifier chip. The output of circuitry 130 is supplied to an A/D converter 132, such as an AD 7820 from Analog Devices of the U.S.A., which outputs to a Viterbi decoder 134, commercially available from Comstream of San Diego, Calif., U.S.A. An output from oscillator 124 is supplied to elements 130, 132 and 134. The output of decoder 134 is supplied to network control logic circuitry 36 (FIG. 2).

Figure 10:
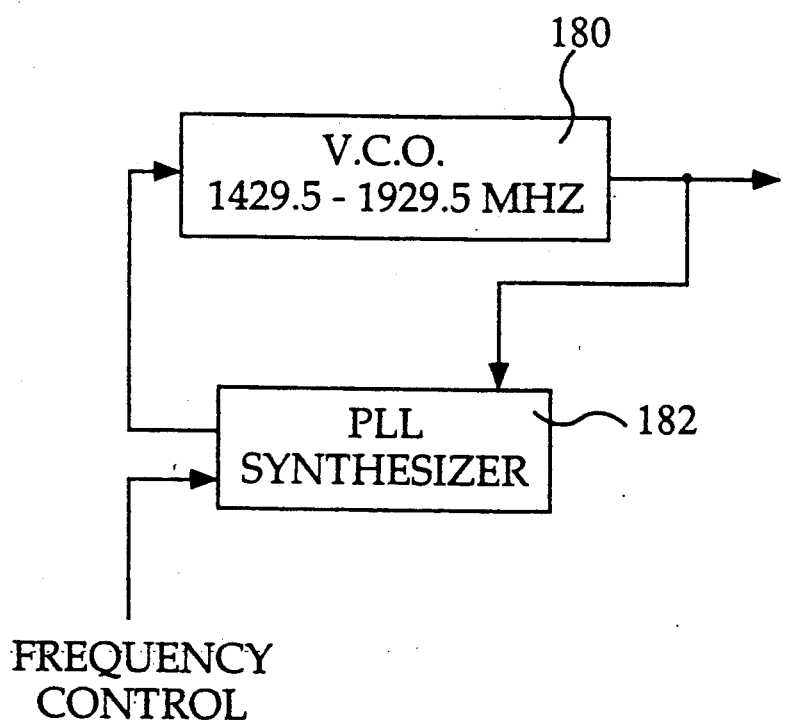
FIG. 10 is a generalized block diagram of part of the circuitry of FIGS. 5A and 5B.

Reference is now made to FIG. 10, which illustrates a synthesizer forming part of the apparatus of FIGS. 5A and 5B. The synthesizer comprises a voltage controlled oscillator 180, preferably operating in the range of 1429.5-1929.5 MHz. An example of such an oscillator is a VTO 8100, manufactured by Avatek of the U.S.A. Oscillator 180 is locked to a selected frequency determined by a frequency control input to a PLL synthesizer 182, which is based on a TA 6359 chip available from Toshiba.

Figure 11:
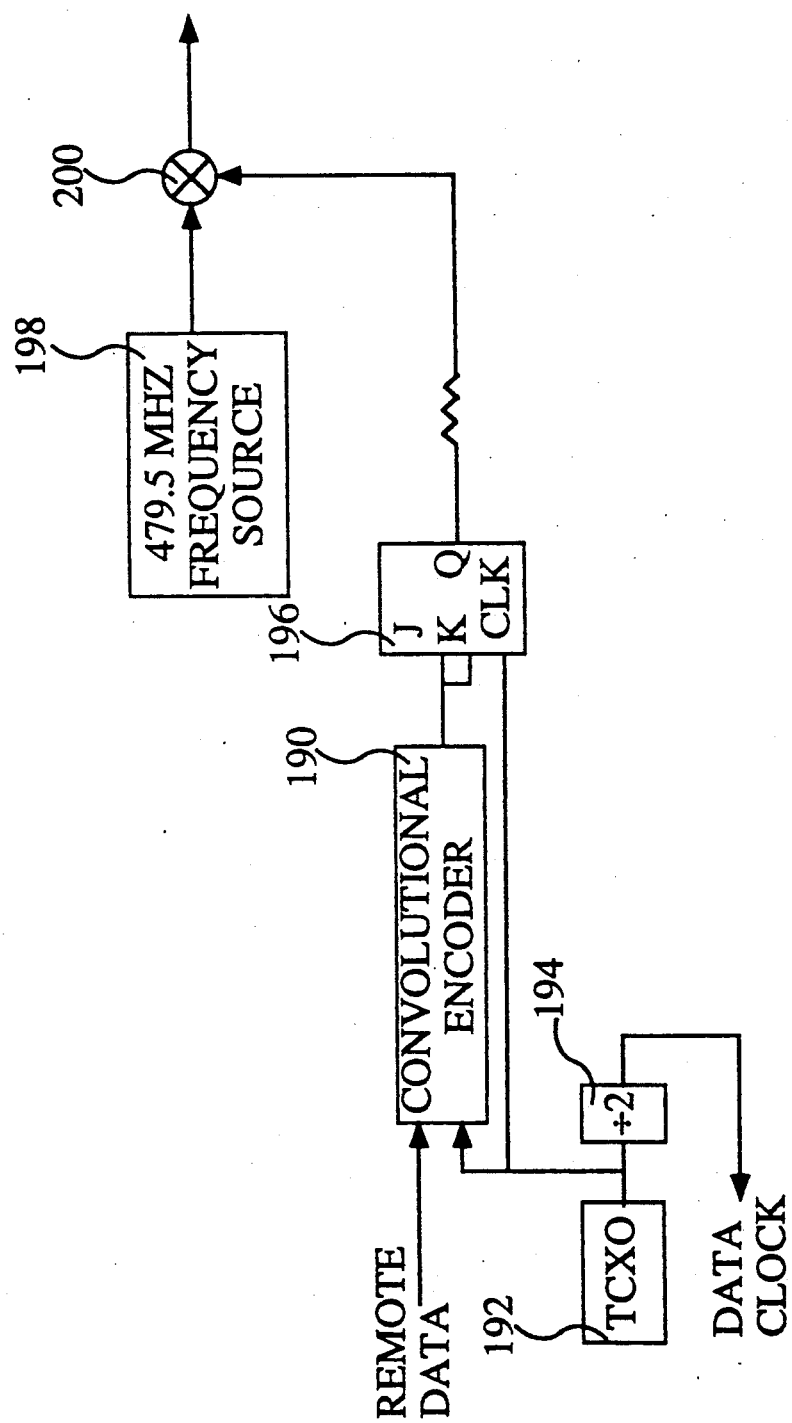
FIG. 11 is a generalized block diagram of another part of the circuitry of FIG. 5A.

FIG. 11 illustrates a DPSK modulator employed in the circuitry of FIG. 5A. The modulator comprises a convolutional encoder 190 commercially available from Comstream of San Diego, Calif., which receives a remote data input. A temperature compensated crystal oscillator 192, such as a ZT-176, manufactured by Greenray, Inc. of the U.S.A. provides a symbol clock output to encoder 190 and also provides, via a divider 194, such as a 74HC4040 of Motorola, a data clock output.

A flip flop 196 receives the output from encoder 190 and the symbol clock output of oscillator 192 and provides a differential signal output to a mixer 200, such as a ZAD-1 of Mini Circuits. The mixer receives an input from a frequency source 198, which is available from RFM Monolithics Inc., typically at a frequency of 479.5 MHz and provides a DPSK signal output.

Figure 12:
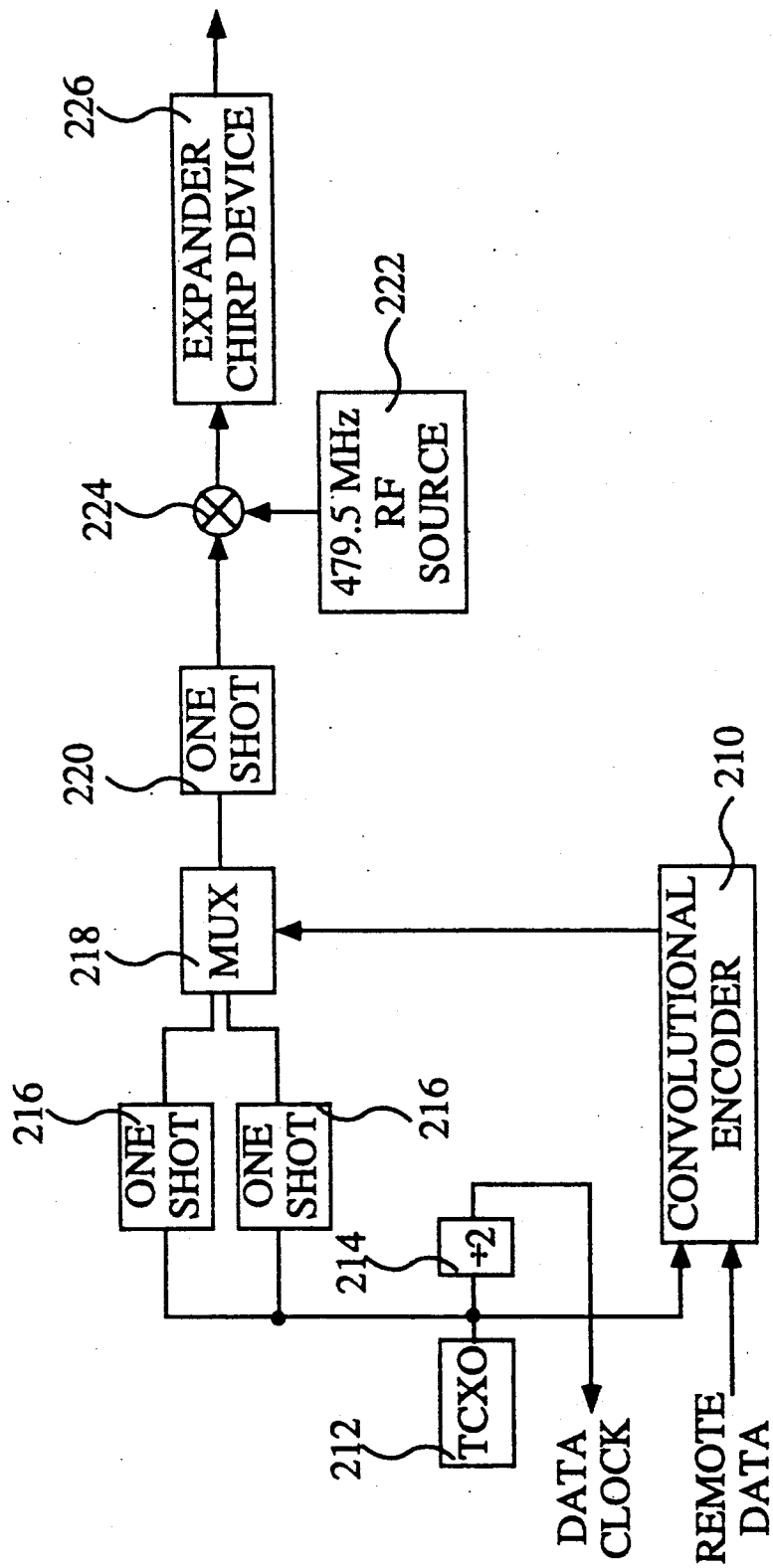
FIG. 12 is a generalized block diagram of another part of the circuitry of FIG. 5B.

FIG. 12 illustrates a Chirp generator forming part of the circuitry of FIG. 5B. The Chirp generator comprises a convolutional encoder 210 commercially available from Comstream of San Diego, Calif., which receives a remote data input. A temperature compensated crystal oscillator 212, such as a ZT-176, manufactured by Greenray, Inc. of the U.S.A. provides a symbol clock output to encoder 210 and also provides, via a divider 214, such as a 74HC4040 of Motorola, a data clock output.

The output of encoder 210 is supplied to a multiplexer 218, which receives inputs from a pair of one shot circuits 216, which receive the symbol clock output from oscillator 212. The multiplexer 218 outputs to a one shot circuit 220, which outputs to a mixer 224, such as a SBL 1 from Mini Circuits. The one shot circuits may typically be embodied in Motorola MC74LS123 chips. The circuitry described hereinabove including elements 216, 218 and 220 produces a digital PPM signal from the output of the convolutional encoder 210.

Mixer 224 also receives a fixed frequency output from a 479.5 MHz RF source 222, which may be identical to frequency source 198, thereby to provide a pulsed RF output to an expander Chirp Device 226, available from SAWTEK, Inc. of Florida, U.S.A.

Details of the structure of the central communications terminal 20 illustrated in FIG. 3 will now be described with reference to FIGS. 7A, 7B, 8, 13A and 13B.

Figure 7A:
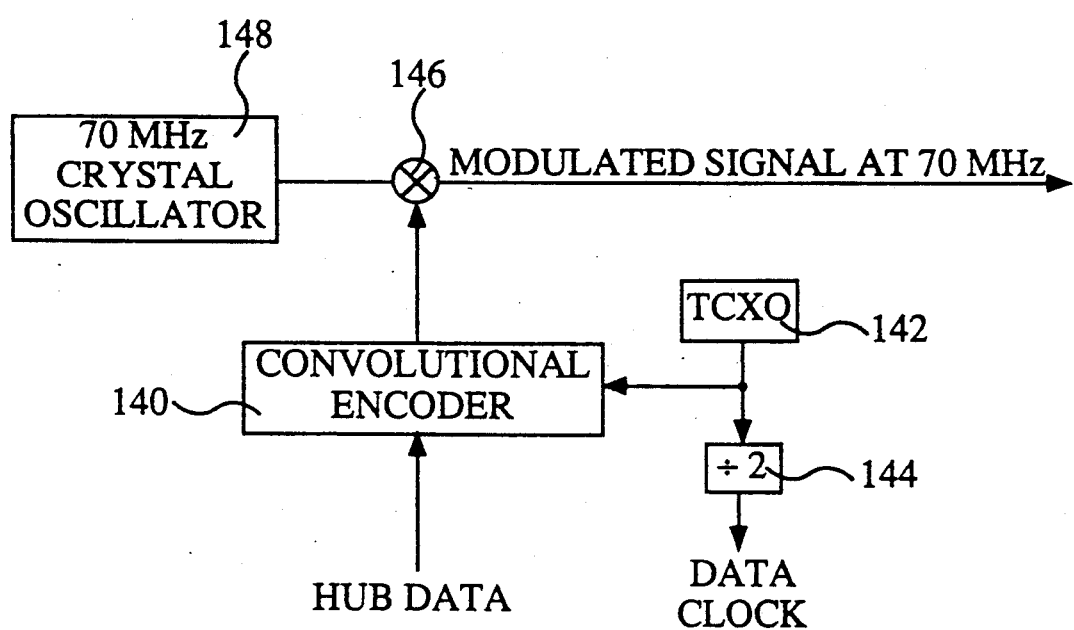
FIG. 7A is a generalized block diagram of part of the circuitry of the terminal of FIG. 3 constructed and operative in accordance with one embodiment of the invention.

Referring now to FIG. 7A there is seen a PSK modulator, forming part of the circuitry of FIG. 3. The modulator comprises a convolutional encoder 140 commercially available from Comstream of San Diego, Calif., which receives a remote data input. A temperature compensated crystal oscillator 142, such as a ZT-176, manufactured by Greenray, Inc. of the U.S.A. provides a symbol clock output to encoder 140 and also provides, via a divider 144, such as a 74HC4040 of Motorola, a data clock output.

The output of encoder 140 provides an output to a mixer 146, such as a ZAD-1 of Mini Circuits. The mixer receives an input from a frequency source 148, which is available from RFM Monolithics Inc., typically at a frequency of 70 MHz and provides a PSK signal output.

Figure 7B:
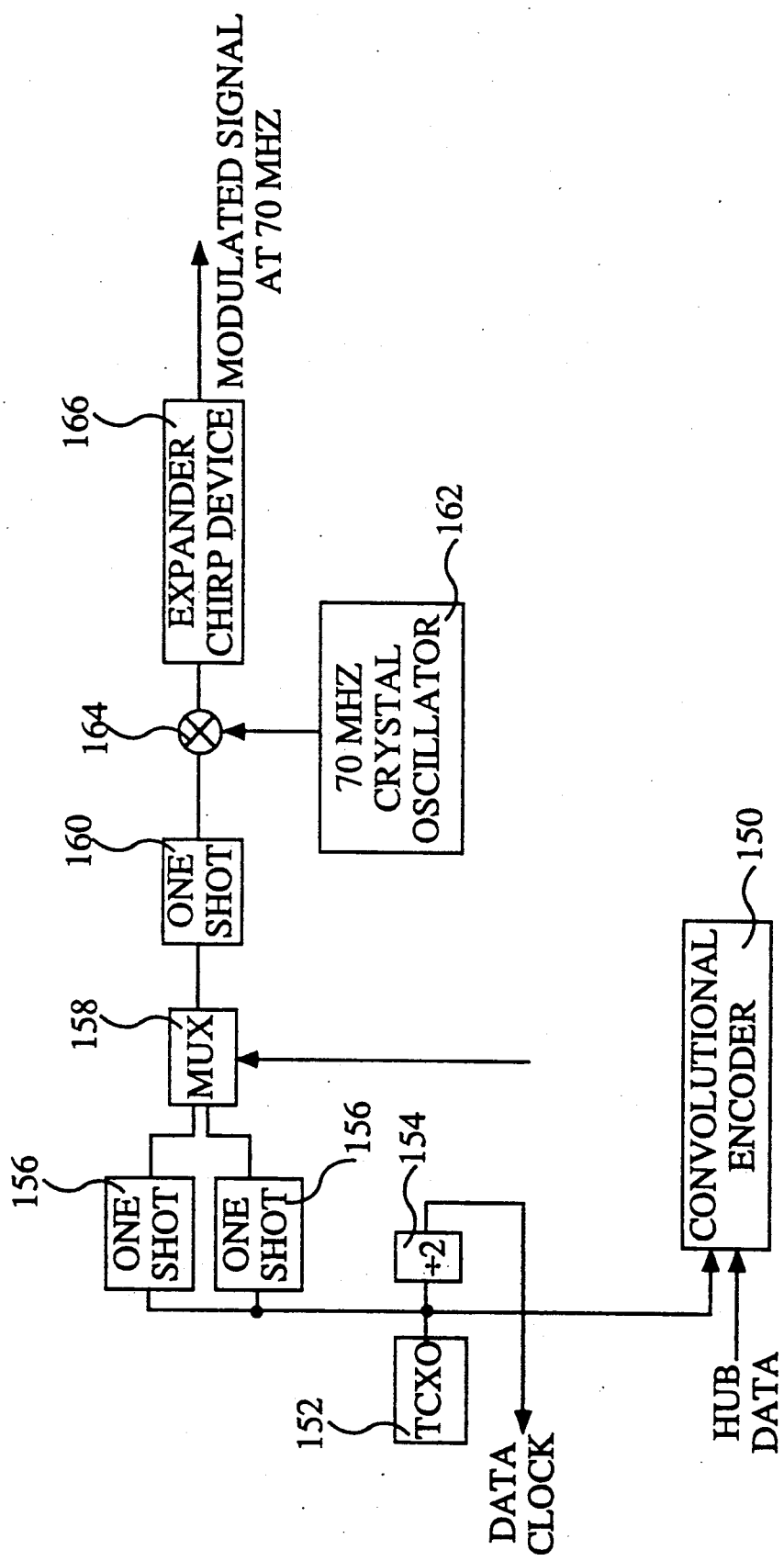
FIG. 7B is a generalized block diagram of part of the circuitry of the terminal of FIG. 3 constructed and operative in accordance with another embodiment of the invention.

FIG. 7B illustrates a Chirp modulator forming part of the circuitry of FIG. 3. The Chirp modulator comprises a convolutional encoder 150 commercially available from Comstream of San Diego, Calif., which receives a remote data input. A temperature compensated crystal oscillator 152, such as a ZT-176, manufactured by Greenray, Inc. of the U.S.A. provides a symbol clock output to encoder 150 and also provides, via a divider 154, such as a 74HC4040 of Motorola, a data clock output.

The output of encoder 150 is supplied to a multiplexer 158, which receives inputs from a pair of one shot circuits 156, which receive the symbol clock output from oscillator 152. The multiplexer 158 outputs to a one shot circuit 160, which outputs to a mixer 164, such as a SBL 1 from Mini Circuits. The one shot circuits may typically be embodied in Motorola MC74LS123 chips. The circuitry described hereinabove including elements 156, 158, and 160 produces a digital PPM signal from the output of the convolutional encoder 150.

Mixer 164 also receives a fixed frequency output from a 70 MHz IF source 162, which may be identical to frequency source 198, thereby to provide a pulsed RF output to an expander Chirp Device 166, available from SAWTEK, Inc. of Florida, U.S.A.

Figure 8:
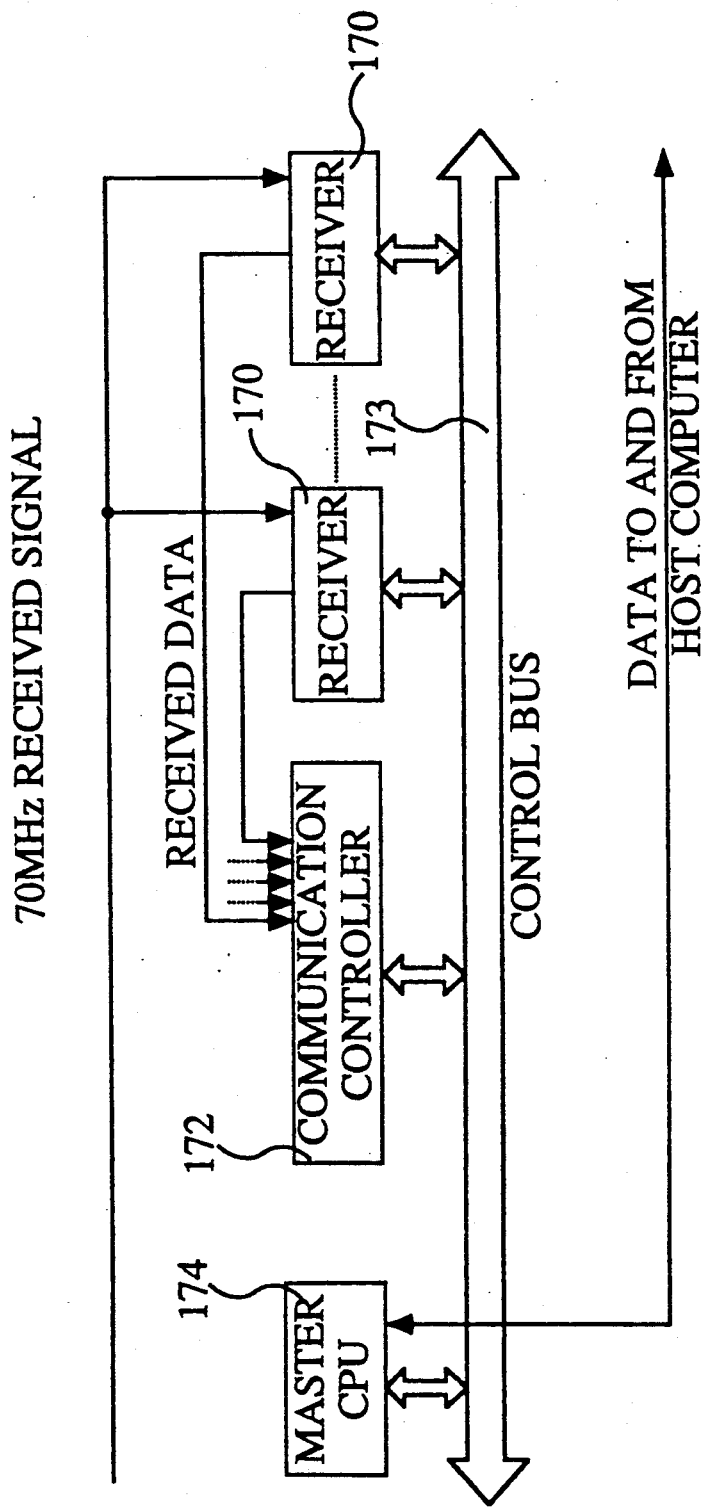
FIG. 8 is a generalized block diagram of still another part of the circuitry of the terminal of FIG. 3.

Reference is now made to FIG. 8, which illustrates network control circuitry 62 and receivers 64 which form part of the circuitry of FIG. 3. A plurality of receivers 170, which are described hereinbelow in greater detail in connection with FIGS. 13A and 13B, receive an IF signal typically at 70 MHz from the down converter 54 (FIG. 3) and output data via a communication controller 172 and a control bus 173 to a master CPU 174. Communication controller 172 is typically a SBS 188/56 board from Intel and the master CPU may be a SBC 286/12 board from Intel.

The master CPU 174 includes logic circuitry for providing acknowledge messages and is operative for interfacing with a Host Computer (not shown) for data communication therewith.

Figure 13A:
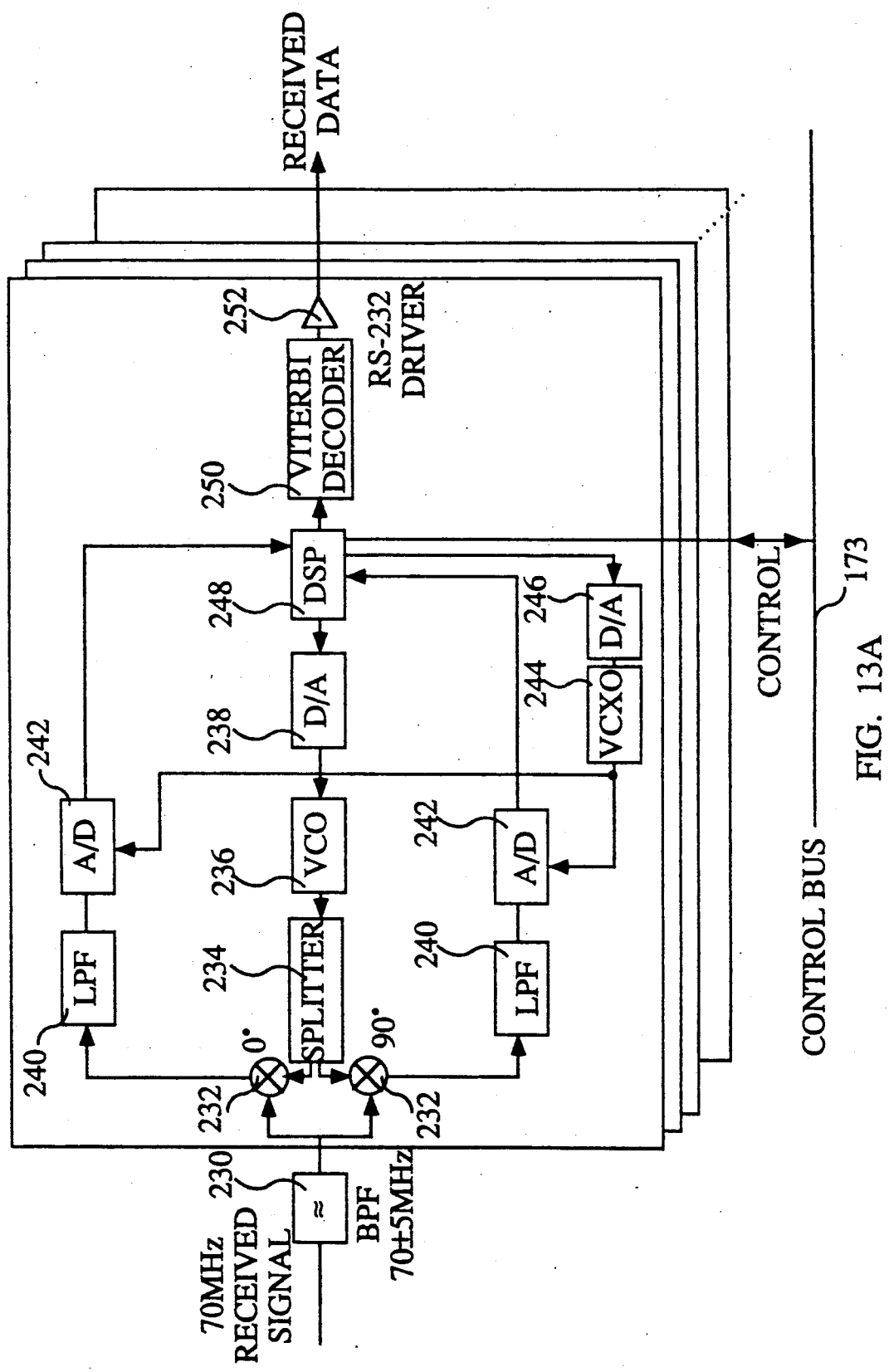
FIG. 13A is a generalized block diagram of part of the circuitry of FIG. 8 constructed and operative in accordance with one embodiment of the invention.

Reference is now made to FIG. 13A, which illustrates one embodiment of a DPSK receiver useful in the invention. A 70 MHz received signal is received via a band pass filter 230, typically having a pass band of 70 plus/minus 5 MHz. The output of filter 230 is supplied to a pair of mixers 232, such as SBL-1 from Mini Circuits. Each mixer 232 receives an input from a sine/cosine (0-90 degree) splitter 234, such as a PSCQ-2-90 by Mini Circuits.

A voltage controlled oscillator 236 supplies a carrier frequency to the splitter 234. The output frequency of oscillator 236 is determined by digital signal processing (DSP) circuitry 248 via a digital to analog converter 238. Oscillator 236 is typically a P-360-65 from Greenray Inc.; DSP circuitry 248 is typically embodied in a MC56000 circuit from Motorola and the digital to analog converter 238 is typically a DAC 10 HT by Burr-Brown.

The outputs of mixers 232 are respective in phase and quadrature base band signals. Each of the mixer 232 outputs is supplied via a low pass filter 240, which may be based on a Harris 4741 chip, to an analog to digital converter 242, such as an ADC 7820 from Analog Devices, which receives a timing input from a voltage controlled crystal oscillator 244, such as an M83 from K & L.

The output voltage of oscillator 244 is determined by the digital signal processing circuitry 248 via a digital to analog converter 246, which may be identical to converter 238.

The outputs of analog to digital converters 242 are supplied to DSP circuitry 248, which also interfaces with control bus 173 (FIG. 8). The output of DSP circuitry 248 is supplied to a Viterbi Decoder 250, commercially available from Comstream, which outputs received data via an RS 232 driver.

Figure 13B:
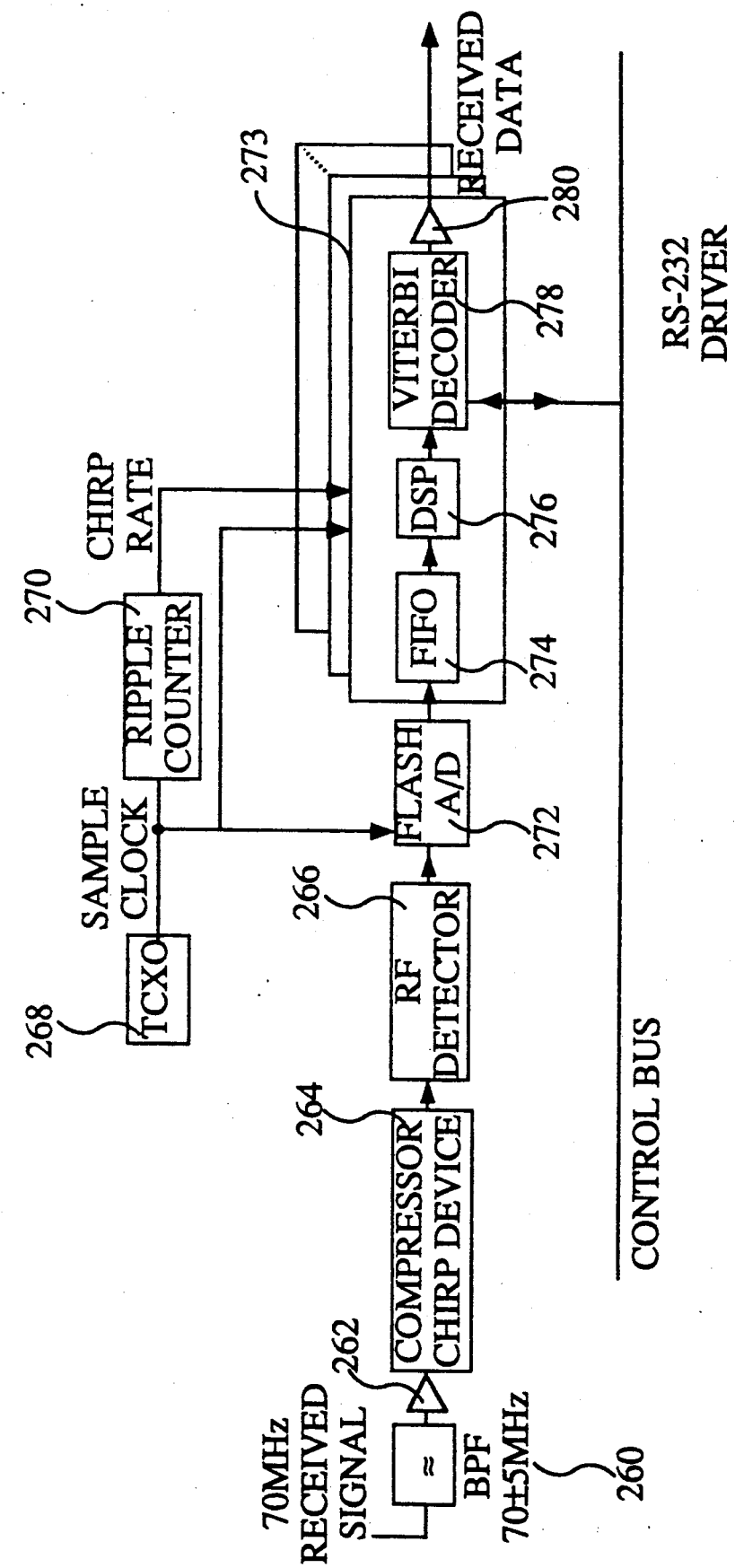
FIG. 13B is a generalized block diagram of part of the circuitry of FIG. 8 constructed and operative in accordance with another embodiment of the invention.

Reference is now made to FIG. 13B, which illustrates a Chirp receiver useful in the circuitry of FIG. 8. A 70 MHz received signal is received via a band pass filter 260, typically having a pass band of 70 plus/minus 5 MHz. The output of filter 260 is supplied, via an RF amplifier 262, such as a MAR-1 from Mini Circuits, to a compressor Chirp device 264, commercially available from SAWTEK. The pulsed RF output of device 264 is supplied to an RF detector 266, such as a UTD-1000 by Avantek, which outputs the envelope of the pulsed output via a flash analog to digital converter 272, such as an AD9000 by Analog Devices, to circuitry 273, forming part of each receiver, which searches for the location of the pulse envelope within a timing window.

Circuitry 273 typically comprises a FIFO circuit 274, such as an IDT 7203 by IDT, digital signal processing circuitry 276, which may be identical to DSP circuitry 248, a Viterbi decoder 278 which may be identical to decoder 250 and an RS 232 driver 280, which may be identical to driver 252. A temperature compensated crystal oscillator 268, such as a ZT-176 from Greenray Inc. provides a timing output to the flash A/D circuitry 272 and to circuitry 273 directly and via a ripple counter 270, such as an MC74HC4040 of Motorola. The output of the ripple counter 270 provides a Chirp rate clock output.

Reference is now made to FIGS. 14-19 which help to illustrate the operation of the Chirp embodiment of the invention.

A basic reference to Chirp waveforms in communications applications is "Principles of Modern Radar", Ed. J. L. Eaves and E. K. Reedy, Van Nostrand Reinhold Company, NY, pp. 469-475, the disclosure of which is incorporated herein by reference.

Figure 14:
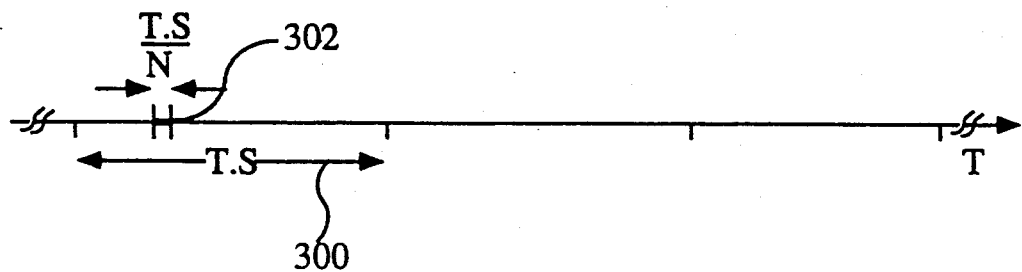
FIG. 14 illustrates (not to scale) a plurality of time slots.
Figure 15:
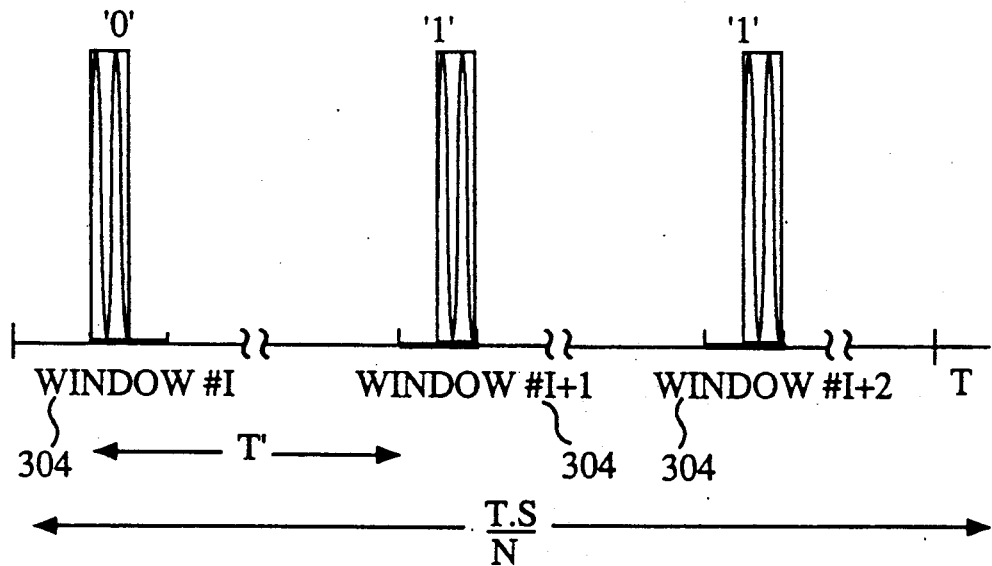
FIG. 15 illustrates in enlargement but also not to scale, a portion of a time slot including a multiplicity of transmission windows.

FIG. 14 illustrates (not to scale) a plurality of time slots 300, each having a typical duration of about 200 milliseconds. FIG. 15 illustrates in enlargement but also not to scale, a portion 302 of a time slot 300 including a multiplicity of transmission windows 304. Each window 304 has a typical duration of 200 nanoseconds. The separation between transmission windows 304 for a given user is typically 100 microsecond.

It is seen in FIG. 15 that pulsed RF energy may be located in either the forward or the rearward position of each time window 304. The position of the pulsed RF energy within the window contains the binary data carried by the signal.

Figure 16:
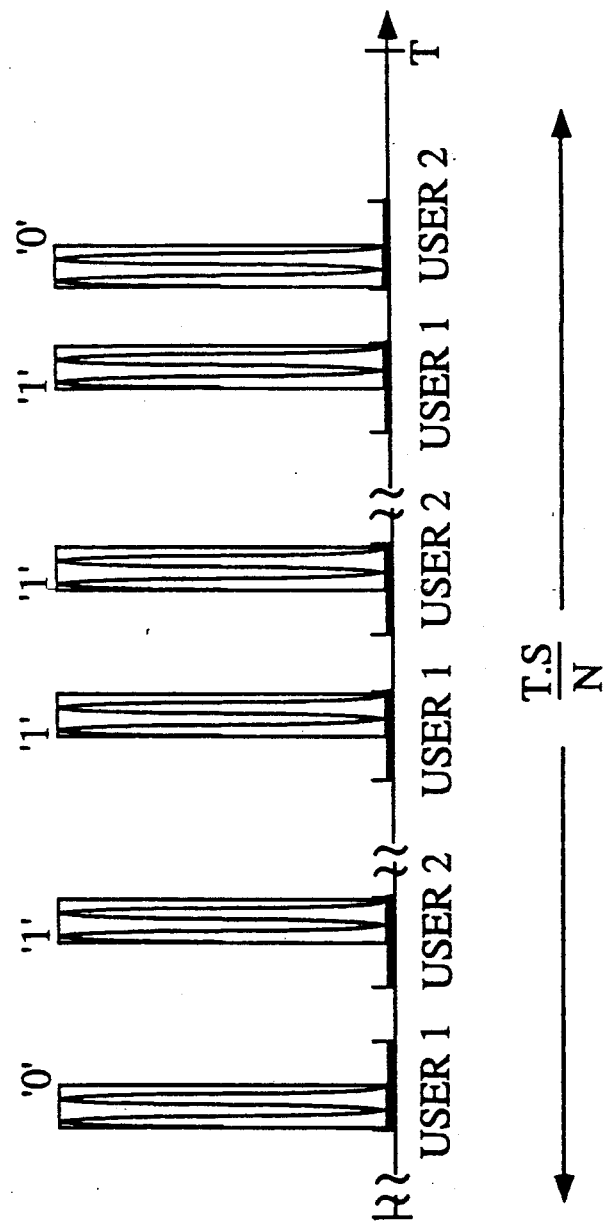
FIG. 16 illustrates that multiple users may transmit within the same time slot without interference therebetween.

Reference is now made to FIG. 16, which illustrates that multiple users may transmit within the same time slot without interference therebetween.

Figure 17:
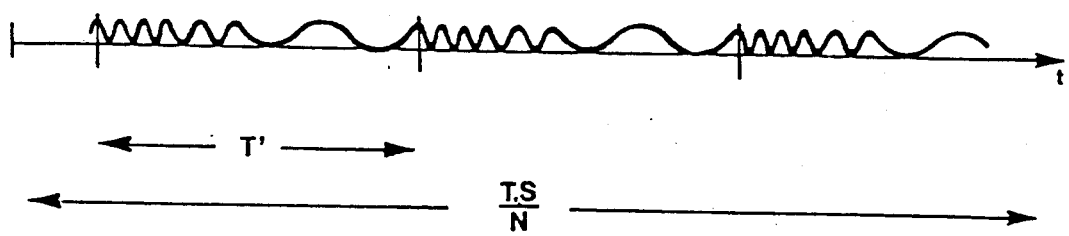
FIG. 17 illustrates conversion of the pulsed RF transmission of FIG. 15 to a constant envelope amplitude transmission through the use of a Chirp filter.

FIG. 17 illustrates conversion of the pulsed RF transmission of FIG. 15 to a constant envelope amplitude transmission through the use of a Chirp filter. This conversion is necessary because pulsed RF is not a suitable modulation technique for digital communication via satellite due to its lack of a constant envelope.

Figure 18:
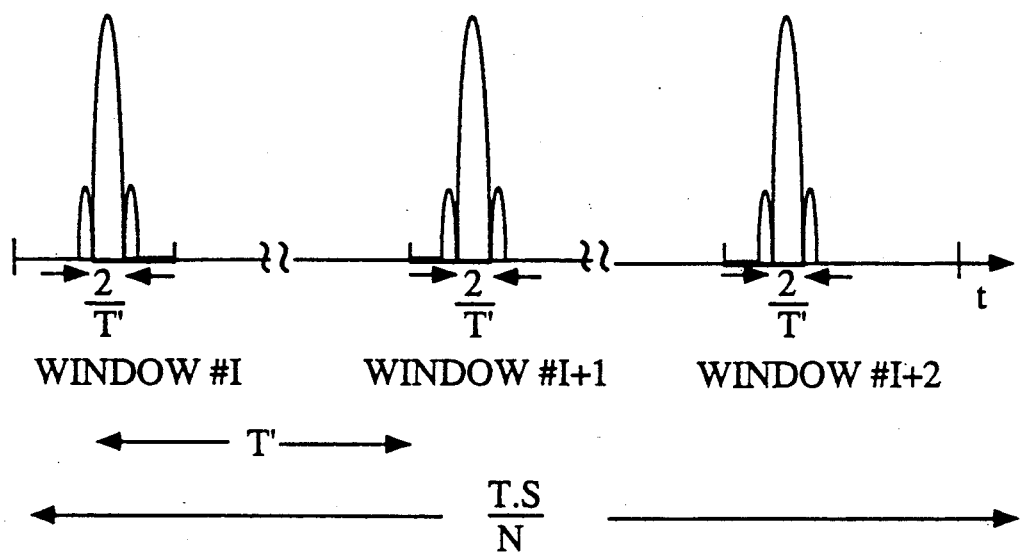
FIG. 18 illustrates the signal which results from passing the modulated signal of FIG. 17 through a matched filter and envelope detector.

FIG. 18 illustrates the signal which results from passing the modulated signal of FIG. 17 through a matched filter and envelope detector. It is noted that the arrangement of the information within the transmission window 304 in FIG. 18 is obtained by passing the signals of FIG. 15 through matched filters and an envelope detector, as is conventional in pulsed RF receivers. It is appreciated that passing the signals of FIG. 15 through a transmitter Chirp filter and through a receiver matched Chirp filter does not change the arrangement of the result as illustrated in FIG. 18.

Figure 19:
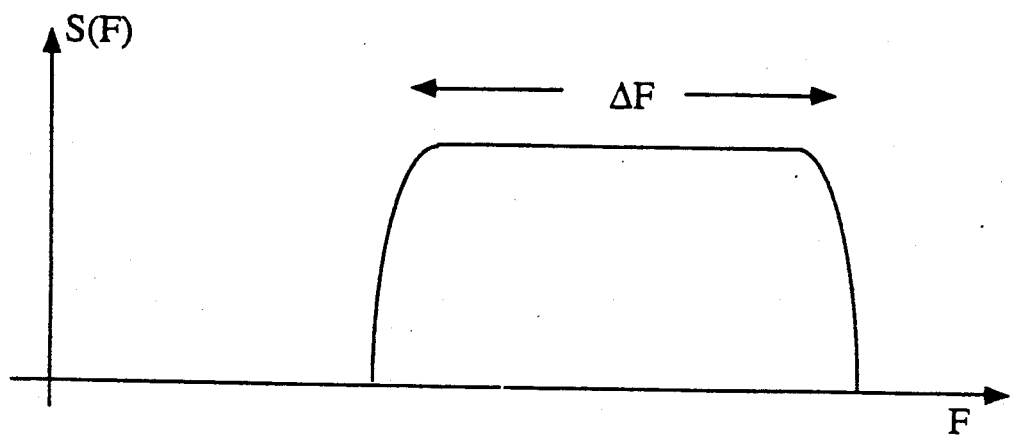
FIG. 19 shows the frequency spectrum of the Chirp modulated transmitted signal.

FIG. 19 shows the frequency spectrum of the Chirp modulated transmitted signal. A characteristic of the linear FM Chirp signal is that its frequency spectrum, illustrated in FIG. 19, has a wide band characteristic relative to the transmitted symbol rate of the modulated signal. As a result, the power spectral density of the signal is significantly lower than that of a conventional (BPSK, QPSK, FSK, for example) narrow band modulated signal.

The terms "Chirp" and "linear FM Chirp" as used throughout the present specification are intended to include applications in which the FM of the Chirp is only roughly linear.

For the purposes of the present specification, a narrow band modulated signal is defined as a signal, 80% of whose power occupies in the frequency domain less than four times its symbol rate in Hertz. Symbols are defined as being the data, after coding if any, which is used to modulate the carrier.

The transmitted power spectral density must be limited in two practical cases:

1. The power spectral density emitted from a satellite transponder is limited in order to prevent a situation where a satellite terminal pointed to an adjacent satellite will receive interference from the transponder. Here, for example, the FCC limits the power spectral density emitted from Ku band satellites for data applications to 6 dbW/4 Khz.

2. The off-beam power spectral density emitted from an antenna which transmits to a satellite is limited in order to prevent interference to an adjacent satellite. Here, for example, the FCC limits the off-beam emission of an antenna transmitting to a Ku band satellite to $-14+29-25\log(theta)$ equals $15-25\log(theta)$ dbW/4 Khz.

Figure 20:
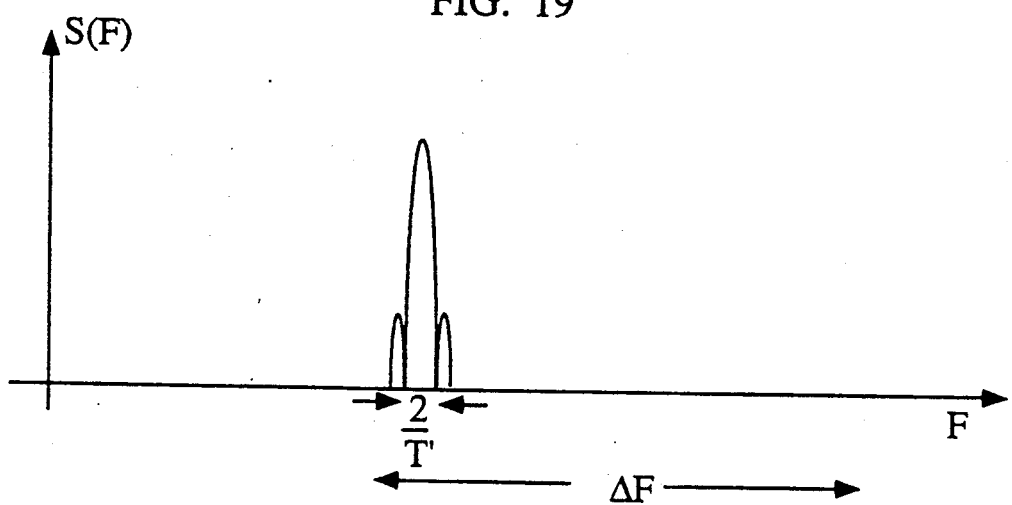
FIG. 20 illustrates the frequency spectrum of a single DPSK modulated transmitted signal within the same frequency bandwidth as in FIG. 19.
Figure 21:
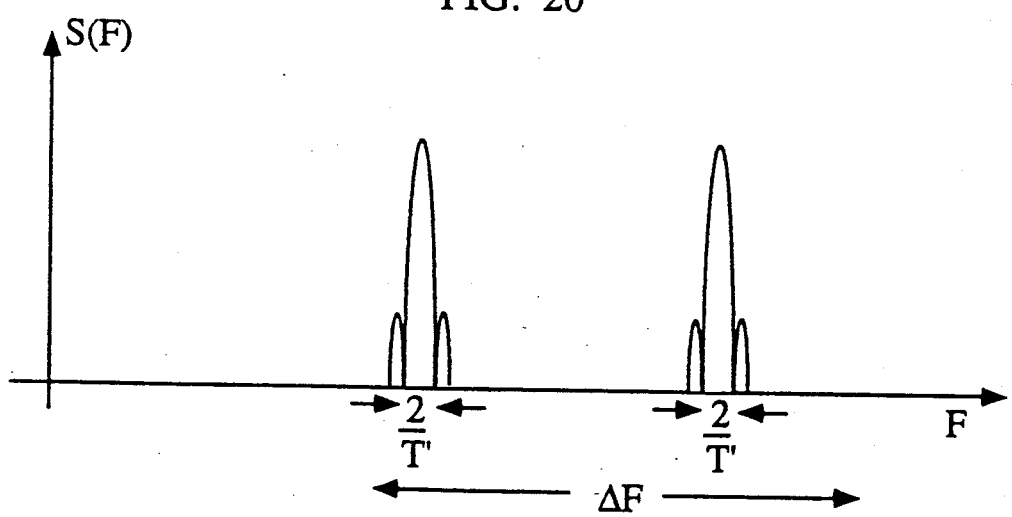
FIG. 21 illustrates the presence of multiple DPSK modulated transmitted signals within the same frequency bandwidth as in FIGS. 19 and 20.
Figure 22:
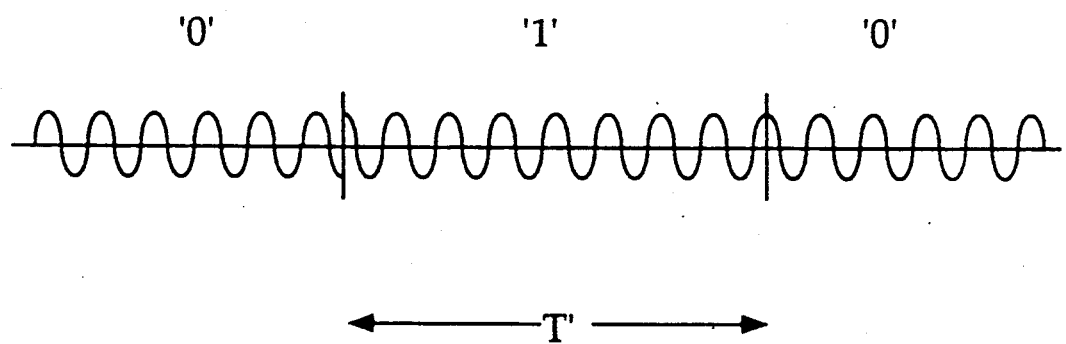
FIG. 22 illustrates the transmitted signal of FIG. 20 in the time domain.

Reference is now made to FIGS. 20-22 which help to illustrate the Differential PSK embodiment of the invention. FIG. 20 illustrates the frequency spectrum of a single DPSK modulated transmitted signal within the same frequency bandwith as in FIG. 19. FIG. 21 illustrates the presence of multiple DPSK modulated transmitted signals within the same frequency bandwidth as in FIGS. 19 and 20. FIG. 22 illustrates the transmitted signal of FIG. 20 in the time domain.

It will be appreciated by persons skilled in the art that the present invention is not limited by what has been particularly shown and described hereinabove. Rather the scope of the present invention is defined only by the claims which follow:

We claim:

1. A satellite communication system comprising:
   a central satellite communication terminal;
   a multiplicity of remote satellite communication terminals which communicate via a satellite on a random access basis;
   means associated with each of the multiplicity of remote satellite communication terminals for transmitting a burst of data to be transmitted within a time slot and having a random or pseudorandom characteristic which is independent of the time slot and which does not require presynchronization with a receiving terminal; and
   receiving means associated with the central satellite communication terminal for acquiring the characteristic during each time slot, receiving the burst according to the time slot and according to the characteristic, and thereby obtaining the data transmitted in said burst,
   said random access communication and the provision of said random or pseudorandom characteristic enabling multiple transmissions to occur concurrently within a given frequency bandwidth.

2. A system according to claim 1 and wherein said characteristic is also independent of time synchronization with the central satellite communication terminal.

3. A system according to claim 1 and wherein said characteristic is a frequency characteristic.

4. A system according to claim 2 and wherein said characteristic is a frequency characteristic.

5. A system according to claim 1 and wherein said characteristic is a phase characteristic indicating the position of transmission windows within a given time slot.

6. A system according to claim 2 and wherein said characteristic is a phase characteristic indicating the position of transmission windows within a given time slot.

7. A system according to claim 5 and wherein said central and remote satellite communication terminals employ matched Chirp filters to enable transmission to be effected within a generally constant amplitude envelope, which is particularly suitable for satellite transmissions.

8. A system according to claim 6 and wherein said central and remote satellite communication terminals employ matched Chirp filters to enable transmission to be effected within a generally constant amplitude envelope, which is particularly suitable for satellite transmissions.

9. A system according to claim 1 and wherein said remote satellite communications terminals employ frequency unstable oscillators.

10. A satellite communication system according to claim 7 and wherein each of said plurality of remote satellite communication terminals which is operative for transmission includes an antenna whose size is sufficiently small that in the absence of the use of linear FM Chirp waveforms or spread spectrum processing in transmission, the off-beam power spectral density would exceed 15–25log(theta) dbW/4 Khz for theta between 1 and 7 degrees in the Ku band.

11. A satellite communication system according to claim 8 and wherein each of said plurality of remote satellite communication terminals which is operative for transmission includes an antenna whose size is sufficiently small that in the absence of the use of linear FM Chirp waveforms or spread spectrum processing in transmission, the off-beam power spectral density would exceed 15–25log(theta) dbW/4 Khz for theta between 1 and 7 degrees in the Ku band.

12. A satellite communication system comprising:
   a central satellite communication terminal;
   a multiplicity of remote satellite communication terminals which communicate via a satellite;
   means associated with said central satellite communication terminal for transmitting digital data information having a wide band modulation characteristic; and
   means associated with the remote satellite communications terminals for receiving the digital data information according to the wide band modulation characteristic, the means for transmitting and the means for receiving employing matched Chirp filters to enable digital data transmission to be effected within a generally constant amplitude envelope, which is particularly suitable for satellite transmissions.

13. A satellite communication system according to claim 12 and wherein each of said multiplicity of remote satellite communication terminals which is operative for receiving includes an antenna whose size is sufficiently small that in the absence of the use of linear FM Chirp waveforms or spread spectrum processing in transmission, the satellite power spectral density would exceed 6 dbW/4 Khz in the Ku band.

14. A system according to claim 12 and wherein said remote satellite communications terminals employ frequency unstable oscillators.

15. A system according to claim 13 and wherein said remote satellite communications terminals employ frequency unstable oscillators.

16. A satellite communication system comprising:
   a plurality of remote satellite communication terminals which communicate via a satellite;
   means associated with each of the plurality of remote satellite communication terminals for transmitting and for receiving information and including means for transmitting and for receiving linear FM Chirp waveforms carrying said information; and
   wherein each of said plurality of remote satellite communication terminals which is operative for receiving includes an antenna whose size is sufficiently small that in the absence of the use of linear FM Chirp waveforms or spread spectrum processing in transmission, the satellite power spectral density would exceed 6 dbW/4 KHz in the Ku band.

17. A satellite communication system comprising:
   a plurality of remote satellite communication terminals which communicate via a satellite;
   means associated with each of the plurality of remote satellite communication terminals for transmitting and for receiving information and including means for transmitting and for receiving linear FM Chirp waveforms carrying said information; and
wherein each of said plurality of remote satellite communication terminals which is operative for transmission includes an antenna whose size is sufficiently small that in the absence of the use of linear FM Chirp waveforms or spread spectrum processing in transmission, the off-beam power spectral density would exceed 15–25log (theta) dbW/4 Khz for theta between 1 and 7 degrees in the Ku band.

* * * * *